(12) United States Patent
Burns et al.

(10) Patent No.: US 10,986,337 B2
(45) Date of Patent: Apr. 20, 2021

(54) SYSTEMS AND METHODS FOR SELECTIVE TRANSMISSION OF MEDIA CONTENT

(71) Applicant: Immersive Tech, Inc., Tampa, FL (US)

(72) Inventors: Mike Burns, Tampa, FL (US); Jon Clagg, Tampa, FL (US); Erik Maltais, Tampa, FL (US)

(73) Assignee: Immersive Tech, Inc., Tampa, FL (US)

( * ) Notice: Subject to any disclaimer, the term of this patent is extended or adjusted under 35 U.S.C. 154(b) by 0 days.

(21) Appl. No.: 16/548,661

(22) Filed: Aug. 22, 2019

(65) Prior Publication Data

US 2021/0058616 A1 Feb. 25, 2021

(51) Int. Cl.
*H04N 19/119* (2014.01)
*H04N 19/172* (2014.01)
*H04N 19/137* (2014.01)
*H04N 19/20* (2014.01)

(52) U.S. Cl.
CPC ......... *H04N 19/119* (2014.11); *H04N 19/137* (2014.11); *H04N 19/172* (2014.11); *H04N 19/20* (2014.11)

(58) Field of Classification Search
CPC .... H04N 19/119; H04N 19/20; H04N 19/137; H04N 19/172
See application file for complete search history.

(56) References Cited

U.S. PATENT DOCUMENTS

| | | | | |
|---|---|---|---|---|
| 7,623,677 B2 * | 11/2009 | Girgensohn | .......... | G06F 16/786 382/103 |
| 9,699,465 B2 * | 7/2017 | Ouedraogo | .......... | H04N 19/119 |
| 9,928,393 B1 * | 3/2018 | Barnum | ............. | G06K 7/10722 |
| 9,936,249 B1 * | 4/2018 | Nelson | ................. | G06K 7/1095 |
| 10,402,781 B2 * | 9/2019 | Terwilliger | ............ | G06Q 10/10 |
| 2015/0334398 A1 * | 11/2015 | Socek | ..................... | G06T 7/174 375/240.26 |
| 2016/0019428 A1 * | 1/2016 | Renner | ............. | G06K 9/00711 382/195 |
| 2017/0118540 A1 * | 4/2017 | Thomas | ................ | H04N 19/167 |
| 2018/0199024 A1 * | 7/2018 | Yip | ...................... | H04N 13/194 |
| 2019/0259124 A1 * | 8/2019 | Barnett | ................ | H04N 19/467 |

* cited by examiner

*Primary Examiner* — Richard A Hansell, Jr.
(74) *Attorney, Agent, or Firm* — KPPB LLP (57) ABSTRACT

Systems and methods for transmitting, encoding, and decoding video in accordance with embodiments of the invention are illustrated. One embodiment includes a method for transmitting video. The method includes steps for partitioning a current frame of video into a plurality of subgrids, identifying active subgrids from the plurality of subgrids for the current frame, generating a longcanvas includes a barcode and image data of the active subgrids, where the barcode includes location data indicating a location within the frame for each active subgrid, transmitting the longcanvas to a destination device.

16 Claims, 10 Drawing Sheets

SYSTEMS AND METHODS FOR SELECTIVE TRANSMISSION OF MEDIA CONTENT

FIELD OF THE INVENTION

The present invention generally relates to selective encoding, transmission, and/or decoding of media content and, more specifically, selective transmission using efficient data structures.

BACKGROUND

In many videography scenarios, especially with static mounted cameras, large portions of the captured field remain unchanged from one frame to the next. Many compression technologies have been devised to reduce the amount of data being transmitted. These are classified as either interframe or intraframe compression that make use of temporal and spatial redundancy. Interframe methods send information related to the changing position of macroblocks from one frame to the next while intraframe methods send information related to parts of a still-image that are similar to other parts of it.

SUMMARY OF THE INVENTION

Systems and methods for encoding, transmitting, and decoding video in accordance with embodiments of the invention are illustrated. One embodiment includes a method for transmitting video. The method includes steps for partitioning a current frame of video into a plurality of subgrids, identifying active subgrids from the plurality of subgrids for the current frame, generating a longcanvas includes a barcode and image data of the active subgrids, where the barcode includes location data indicating a location within the frame for each active subgrid, transmitting the longcanvas to a destination device.

In a further embodiment, identifying active subgrids comprises comparing image data from each subgrid of the plurality of subgrids to corresponding subgrid in a previous frame to determine a level of change, and selecting a subset of the plurality of subgrids as active subgrids based on the comparison.

In still another embodiment, the level of change includes a count of changed pixels in the particular subgrid, where a pixel is a changed pixel when a difference in a pixel value for a pixel in the current frame and a corresponding pixel value for a corresponding pixel in the previous frame exceeds a first threshold value, and selecting a subset of the plurality of subgrids as active subgrids includes determining that a subgrid is an active subgrid when the count of changed pixels exceeds a second threshold value.

In a still further embodiment, computing a count of changed pixels in the particular subgrid comprises sampling a subset of the pixels from the particular subgrid in the current frame and a corresponding subgrid in the previous frame, and determining whether each pixel of the subset of pixels exceeds the first threshold value.

In yet another embodiment, selecting a subset of the plurality of subgrids as active subgrids comprises sorting the plurality of subgrids based on the determined level of change, and selecting a predetermined number of subgrids as active subgrids.

In a yet further embodiment, the barcode is a visualization of the current frame includes a portion of the barcode corresponding to each subgrid of the plurality of subgrids, and each active subgrid is represented as a portion of the barcode in a different color than subgrids not selected as active.

In another additional embodiment, the barcode and the image data of each of the active subgrids have a same aspect ratio.

In a further additional embodiment, identifying active subgrids comprises determining whether a duration since a last inverted barcode exceeds a threshold value, wherein the duration includes at least one of a number of frames and a period of time, and selecting all subgrids not identified as active in a previous frame as active subgrids when the duration exceeds the threshold value.

One embodiment includes a method for decoding video. The method includes steps for receiving a longcanvas includes a barcode and image data of the active subgrids, where the barcode includes location data indicating a location within a frame for each active subgrid, analyzing the barcode to determine the location for each active subgrid, and updating a canvas with the image data of the active subgrids at the determined locations.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, systems and methods for efficient selective transmission of media content are described herein. Systems and methods in accordance with several embodiments of the invention provide a fundamentally different type of compression, selective transmission, that sends actual video data but saves on bandwidth by only sending data from the areas that have sufficiently changed from one frame to the next in a typical encoding/decoding procedure. In various embodiments, selective transmission can be used to send video using far less data or can be used to store video with significantly reduced file sizes, especially when paired with other compression techniques.

In various embodiments, a number of parameters of encoding processes can be defined to control the encoding and/or decoding processes. Encoding parameters in accordance with a variety of embodiments of the invention can include (but are not limited to) Rows/Columns, Difference Threshold, Sampling, Transmit Limit, and/or Rolling Count. Rows/Columns can indicate how many rows and columns to subdivide (or partition) the original frame into. Partitions (or subgrids) in accordance with several embodiments of the invention can be of multiple sizes and can change during a presentation based on various metrics such as (but not limited to) available bandwidth and/or an amount of change that is detected in a frame. A difference threshold in accordance with numerous embodiments of the invention can indicate how large a difference between two pixels needs to be to register as a changed. In some embodiments, difference thresholds can indicate a number of pixels that need to exceed a difference threshold for a subgrid to be marked as active. A sampling parameter in accordance with various embodiments of the invention can indicate how many pixels to skip before making the next comparison. In some embodiments, pixels can be sampled in other ways such as (but not limited to) randomly. Transmit limits in accordance with some embodiments of the invention can indicate the maximum percentage of the frame data that will be sent. For example, transmit limits can indicate that no more than half of the frame data is sent at any given time. Rolling count parameters can indicate how many frames of active subgrids will be sent before sending inactive subgrids. In many embodiments, a rolling count is maintained to ensure that all of the subgrids of a frame are periodically updated, even if a particular subgrid does not ever exceed the difference threshold.

Systems and methods in accordance with various embodiments of the invention can be used to encode, transmit, and/or decode media content in an efficient and consistent manner.

Encoding Process

Selective transmission in accordance with a variety of embodiments of the invention can be achieved using a novel encoding process that can reduce the amount of bandwidth required to transmit video. An encoding process in accordance with numerous embodiments of the invention is conceptually illustrated in FIG. 1. In a number of embodiments, encoding processes can be performed on a stream of media content. Captured frames from media streams in accordance with a number of embodiments of the invention can be painted to a canvas at the encoder for analysis (e.g., partitioning, change detection, etc.). Although many of the examples described herein refer to video, one skilled in the art will recognize that similar systems and methods can be used in a variety of applications, including (but not limited to) virtual reality (VR) and/or augmented reality (AR), without departing from this invention.

Figure 1:
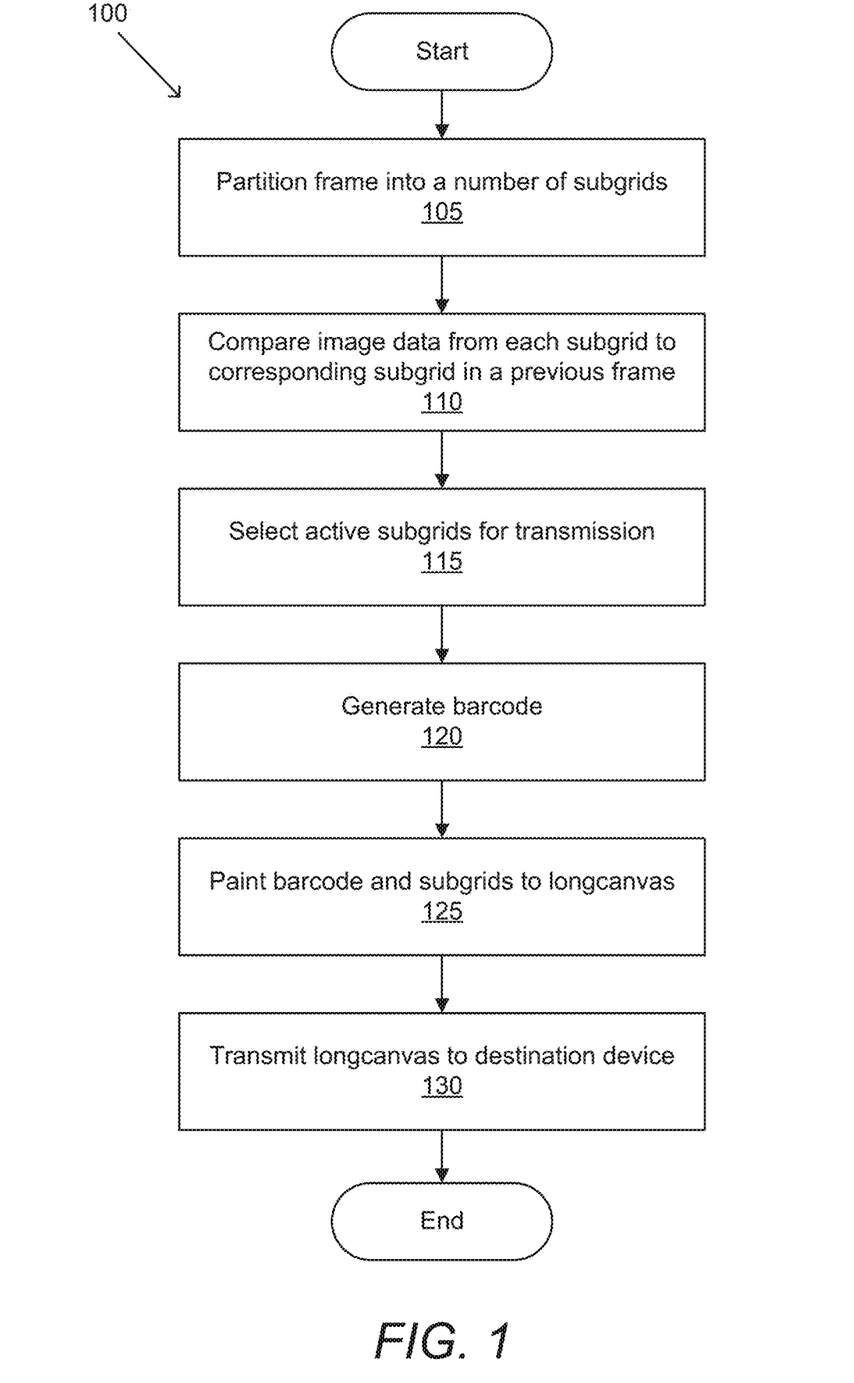
FIG. 1 conceptually illustrates a process for encoding and transmitting a longcanvas in accordance with an embodiment of the invention.

In this example, process 100 partitions (105) a frame (or image) into a number of subgrids. In various embodiments, the number, size and/or shape of the subgrids can change during the encoding process of a media stream. For example, processes in accordance with many embodiments of the invention can determine a number of subgrids to use based on various measures including (but not limited to) video content diversity, available bandwidth, etc. In a variety of embodiments, encoding parameters are transmitted to the receiver device so that the receiver device is able to decode the encoded video.

Process 100 compares (110) image data from each subgrid to a corresponding subgrid in a previous frame. Comparing subgrids of frames in accordance with numerous embodiments of the invention can involve any of a variety of different methods for determining changes within the subgrid. In numerous embodiments, comparisons can be made between pixel values (e.g., RGB) that are sampled from subgrids of both a current and prior frame. Sampled pixel values in accordance with several embodiments of the invention can include various measurements of an individual pixel's value, such as (but not limited to) an RGB value, a brightness value, and/or a value for the pixel that accounts for (e.g., weighted) values of nearby pixels. In a number of embodiments, changes of each subgrid can be calculated based on a count of the pixels where the difference in the pixel values for corresponding pixels between the current and prior subgrids exceed a threshold value. Alternatively, or conjunctively, changes in accordance with several embodiments of the invention can be computed as some other aggregate change (e.g., average, sum, etc.) in the sampled pixel values between the corresponding subgrids of current and prior frames. In various embodiments, parameters can be defined at an encoder to define metrics and/or thresholds for measuring change for subgrids between frames.

Process 100 selects (115) active subgrids for transmission. Active subgrids in accordance with certain embodiments of the invention can be selected based on whether changes (e.g., aggregate pixel value changes) in the subgrid exceed a particular threshold. In various embodiments, rather than determining whether a threshold is exceeded, the change between the prior and current frames is measured for all of the subgrids, the subgrids are sorted by the measured change, and a fixed number of subgrids are selected as active.

In some embodiments, a subgrid can be selected as active, even if the changes do not exceed a particular threshold, but after a given duration (e.g., a number of frames, a period of time, etc.). For example, processes in accordance with various embodiments of the invention can periodically use a rolling count to select, as active, all of the frames that were not marked as active in a previous frame (e.g., by reversing the active subgrids of a barcode). In a number of embodiments, the step for comparing the image data of the subgrids is not performed after the rolling count (e.g., when a barcode is to be reversed). Alternatively, or conjunctively, rather than using a rolling account, processes in accordance with some embodiments of the invention can compute changes in subgrids in a way that accounts for the time since the subgrid was last updated. For example, processes in accordance with various embodiments of the invention can use a weighted combination of the time since a given subgrid was last refreshed and the amount of change in the frame.

Active subgrids in accordance with various embodiments of the invention can also be identified based on some combination of measures described above. For example, processes in accordance with numerous embodiments of the invention can select all subgrids that exceed a threshold change amount, up to a maximum subgrid count (e.g., a transmit limit). Although many of the examples described herein describe various measures and thresholds for changes, one skilled in the art will recognize that similar measures and thresholds can be used in a variety of applications without departing from this invention. An example of a process for selecting active subgrids in accordance with an embodiment of the invention is described in greater detail below with reference to FIG. 2.

Process 100 generates (120) a barcode to designate where each active subgrid goes. Barcodes in accordance with numerous embodiments of the invention can be used to provide location information for subgrids that are being transmitted (and/or those that are not being transmitted) for a given frame. In numerous embodiments, barcodes have the same dimensions as the subgrids of a frame. In some embodiments, both the barcode and the subgrids have a same aspect ratio as the encoded frame. Barcodes and subgrids in accordance with some embodiments of the invention do not share the same aspect ratio as the encoded frame. Sharing a same aspect ratio as the encoded frame can allow decoding processes in accordance with many embodiments of the invention to determine the dimensions of each subgrid (as well as the rows and/or columns) without specifying these elements prior and/or in metadata received with the encoded longcanvas. In numerous embodiments, a barcode is partitioned with the same rows/columns as the frame, where each partition of the barcode represents a corresponding subgrid of the frame. Barcodes in accordance with certain embodiments of the invention can provide binary (e.g., black and white) indications of whether a corresponding subgrid is active. In various embodiments, barcodes can be encoded in grayscale, allowing for a decoder to determine a level of change for each subgrid of a frame.

Process 100 paints (125) the barcode and active subgrids to a new canvas (or longcanvas). In several embodiments, barcodes are printed as a first portion of a longcanvas and the active subgrids are appended in a particular order (e.g., left-to-right, top-to-bottom; high-change-to-low-change; etc.). Process 100 transmits (130) the painted longcanvas to the destination device. Destination devices in accordance with a number of embodiments of the invention can include (but is not limited to) a media distribution server, a playback device, a decoding server, etc.

Figure 2:
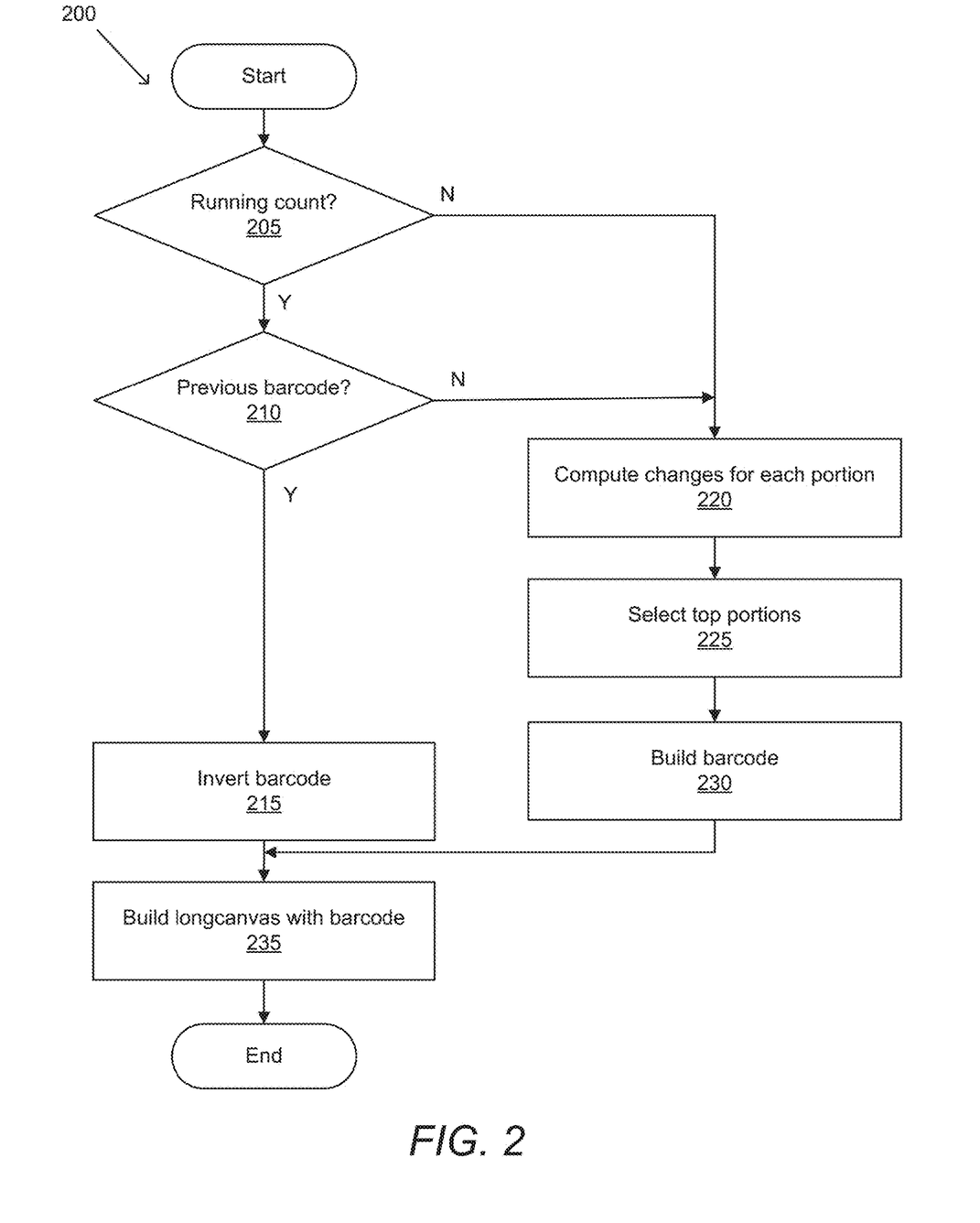
FIG. 2 conceptually illustrates an example of a process for generating a barcode in accordance with an embodiment of the invention.

An example of a process for generating a barcode in accordance with an embodiment of the invention is illustrated in FIG. 2. Process determines (205) whether a running count has been exceeded (e.g., six times per second). Running counts in accordance with many embodiments of the invention can indicate a duration (e.g., time, number of frames, etc.) since all of the subgrids have been updated (e.g., since the last inverted barcode). In a number of embodiments, running counts can be used to ensure that all subgrids of a frame are updated at some point, even if the actual change level is low.

When the process determines (205) that the running count has been exceeded, the process determines (210) whether there is a previous barcode. Previous barcodes in accordance with certain embodiments of the invention can include a barcode for any previous frame in a video presentation.

When the process determines (210) that there is a previous barcode (as is the case for most frames), the process inverts (215) the previous barcode. Inverting the barcode in accordance with some embodiments of the invention can mark all active subgrids as inactive, while marking all inactive subgrids as active, so that all the subgrids have been updated in either the previous or the current barcode.

When the process determines (205) that the running count has not been exceeded or when the process determines (210) that there is no previous barcode (e.g., after a first frame), the process computes (220) changes for each portion (or subgrid) of a current frame compared with a corresponding portion in a previous frame. Changes between subgrids can be computed in various ways as described throughout this description. Process 200 selects (225) the top changed portions as active. The top (or most) changed portions can be selected in a variety of ways, as described throughout this description. Process 200 builds (230) a barcode based on the selected portions. In certain embodiments, barcodes can be built in a portion of a longcanvas with the same dimensions as the subgrids of the frame. Barcodes in accordance with numerous embodiments of the invention can be black and white representations of the frame, indicating whether a corresponding subgrid of the frame is active. Once either the barcode has been inverted (215) or built (230), the process builds (235) a longcanvas with the new barcode. Longcanvases in accordance with a variety of embodiments of the invention can include a barcode along with image data from the active subgrids as indicated in the barcode.

While specific processes for selective transmission are described above, any of a variety of processes can be utilized to selectively transmit video as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Once a barcode has been generated, a longcanvas (or some other method of packaging data) can be encoded for transmission. An example of encoding a longcanvas in accordance with an embodiment of the invention is illustrated in three stages 305-315 of FIG. 3. The first stage 305 illustrates a prior frame 320 and a new frame 325. Prior frames in accordance with certain embodiments of the invention can be the frame immediately prior to a current (or new) frame in the timed display of a video presentation. In this example, the prior frame 320 illustrates an individual in the center of the frame. New frame 325 shows the individual has moved towards the right of the frame and repositioned their arm.

Figure 3:
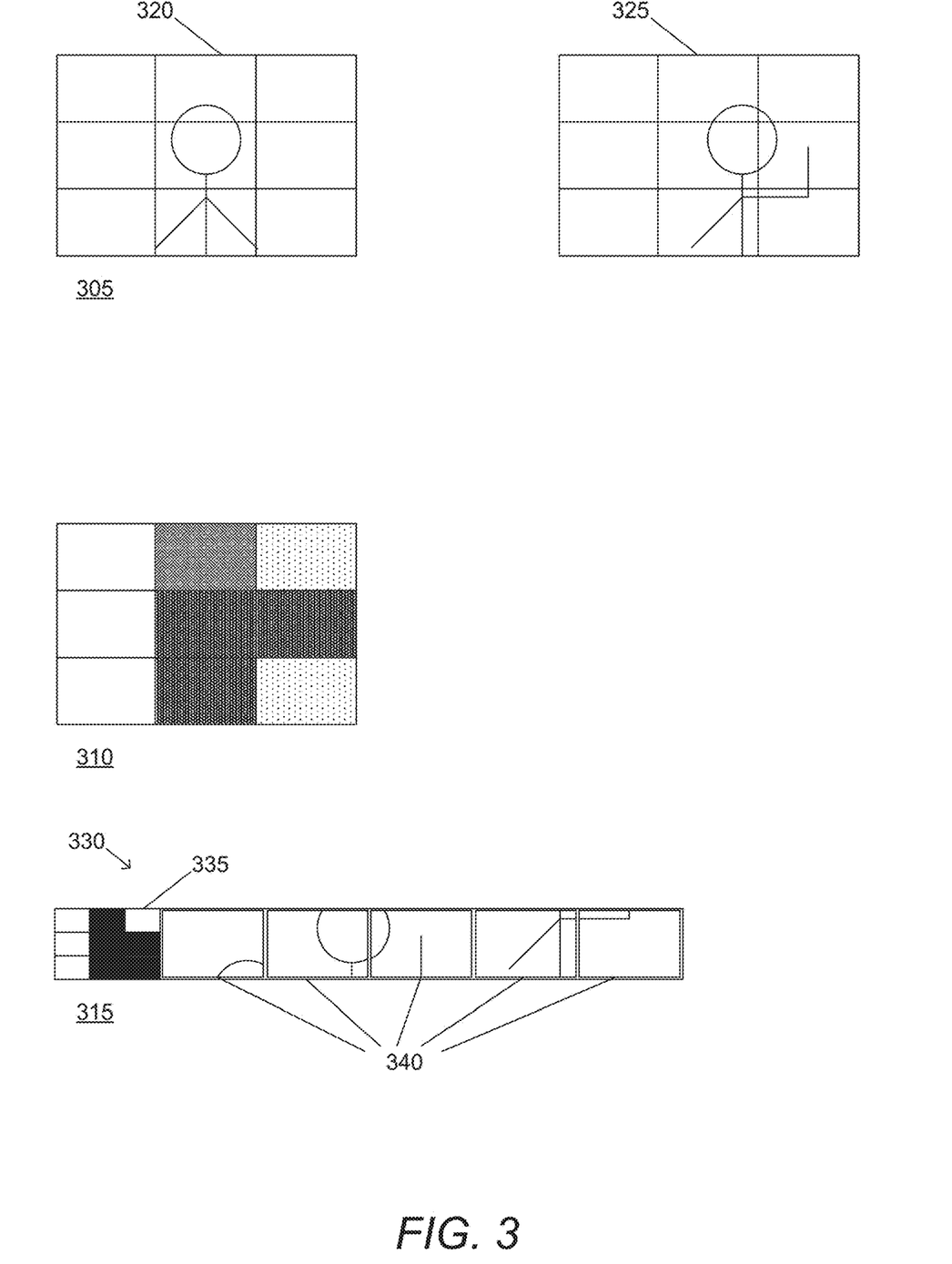
FIG. 3 illustrates an example of encoding a longcanvas in accordance with an embodiment of the invention.

The second stage 310 visually illustrates an analysis of changes between the prior and new frames 320 and 325, respectively. In this example, the greatest changes are identified in the darkest regions, with lighter regions indicating lower levels of changes. Changes between frames in accordance with many embodiments of the invention can be identified in a variety of ways, including (but not limited to) based on differences between pixel values between the different frames.

In the third stage 315, a longcanvas 330 has been constructed. Longcanvas 330 includes a barcode 335 and partitions 340. In this example, barcode 335 shows a representation of the frame, with the high-change portions indicated in black. Partitions 340 include the video from the identified high-change portions of the new frame. In various embodiments, by sending only high-change portions of a frame, selective transmission can be used to reduce and/or manage the bandwidth required to provide high quality video to a decoder.

Decoding Process

Figure 4:
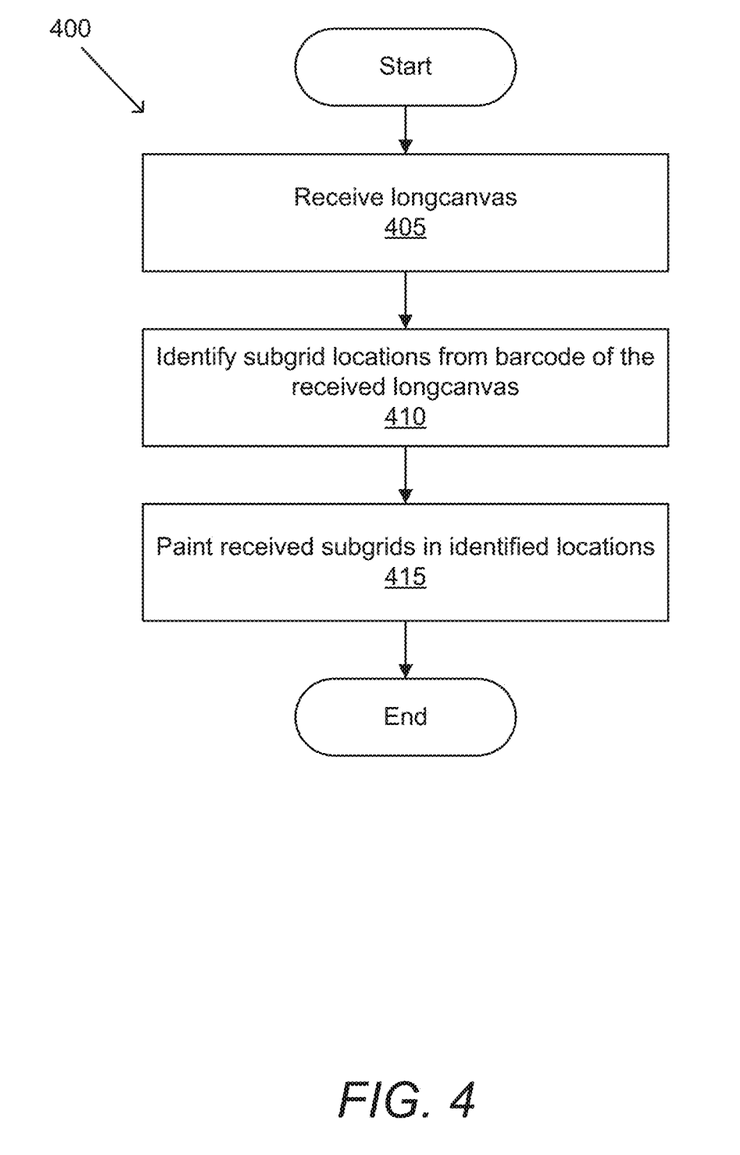
FIG. 4 conceptually illustrates a process for decoding a longcanvas in accordance with an embodiment of the invention.

Once encoded video is received at a receiving device, the encoded video needs to be decoded for display. A process for decoding encoded video is conceptually illustrated in FIG. 4. Process 400 receives (405) a longcanvas of encoded video. Encoded video in accordance with a number of embodiments of the invention includes a barcode and a set of one or more subgrids, where each subgrid includes video data for the subgrid. Process 400 identifies (410) destinations of each received subgrid from a barcode from the received longcanvas. In a variety of embodiments, processes can read a barcode by reading a specific point (e.g., a midpoint) of each barcode block to identify a state (e.g., active or inactive) of that grid. An example of a process for decoding a longcanvas (and its barcode) is described below with reference to FIG. 5. Process 400 paints (415) the received subgrids to the identified locations on top of the canvas of the previous frame.

Figure 5:
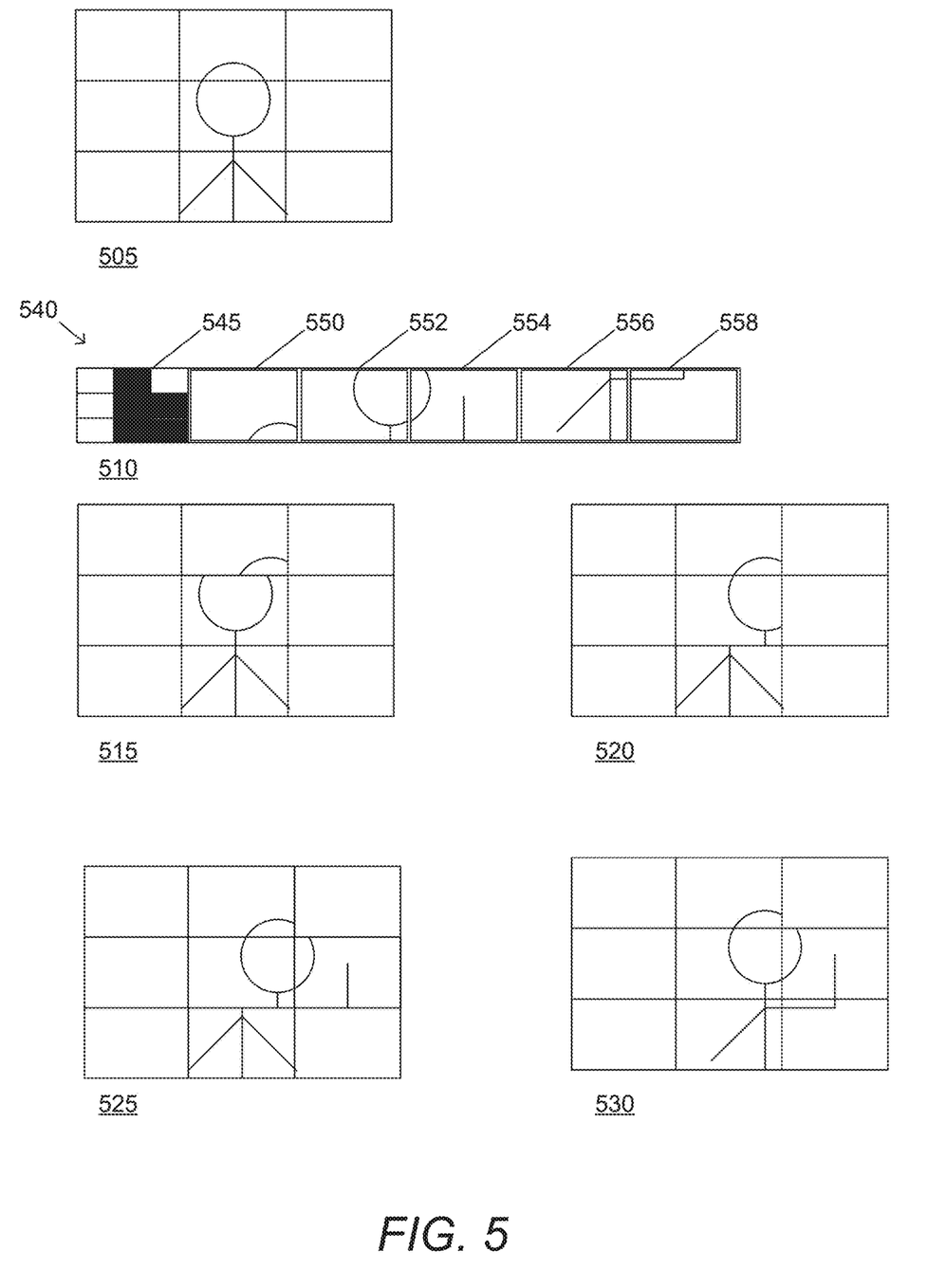
FIG. 5 illustrates an example of decoding a longcanvas in accordance with an embodiment of the invention.

An example of decoding a longcanvas in accordance with an embodiment of the invention is illustrated in six stages 505-530 of FIG. 5. The first stage 505 illustrates a canvas at a decoding device prior to receiving a longcanvas for updating the canvas at the receiving device. As with the prior frame in the example of FIG. 3, the canvas 520 illustrates an individual in the center of the frame.

The second stage 510 illustrates a longcanvas 540 that is received at the receiving device. Longcanvas 540 includes a barcode 545 and a number of active subgrids 550-558. Each subgrid 550-558 corresponds to an active (black) subgrid in barcode 545.

In the third stage 515, the canvas has been updated with the first active subgrid 550 from longcanvas 540. Similarly, the fourth and fifth stages 520 and 525, illustrate that the canvas has been updated with the second and third active subgrids 552 and 554 respectively. The sixth stage 530 shows that all of the subgrids 550-558 of longcanvas 540 have been updated in the canvas.

In this example, the longcanvas does not update all of the subgrids of the canvas. Specifically, the top right frame has not been updated in this example. In many embodiments, a canvas can be updated many times per second, so that not updating a specific subgrid in any given longcanvas will likely not be detectable, particularly as the most active subgrids will be updated in each update. Further, processes in accordance with many embodiments of the invention can force all of the subgrids to periodically update (e.g., six times per second) to ensure that no subgrid becomes too out of sync with the actual content.

While specific processes for decoding selectively transmitted video are described above, any of a variety of processes can be utilized to decode video as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Transmission errors of reference frames or motion vectors can produce significant visual distortions in the decoded video on the receiving end. Selective transmission processes in accordance with some embodiments of the invention do not send more than a given transmit limit (predefined, updated). In this manner, encoding errors and/or loss of quality can be avoided because reference frames and motion vectors are not used. In a variety of embodiments, actual video pixel data can be transmitted within each subgrid, rather than information about how that information can be derived. The video quality does not need to be reduced since intraframe compression is not being used. In many cases, bandwidth limitations can lead to downscaling of a video's quality. Selective transmission in accordance with many embodiments of the invention can allow the highest quality video to be delivered without the need to send the entirety of the video frame. In a number of embodiments, a full 4K scene can be delivered while only sending a 2K frame with a barcode.

Systems for Doing Something

Selective Transmission System

Figure 6:
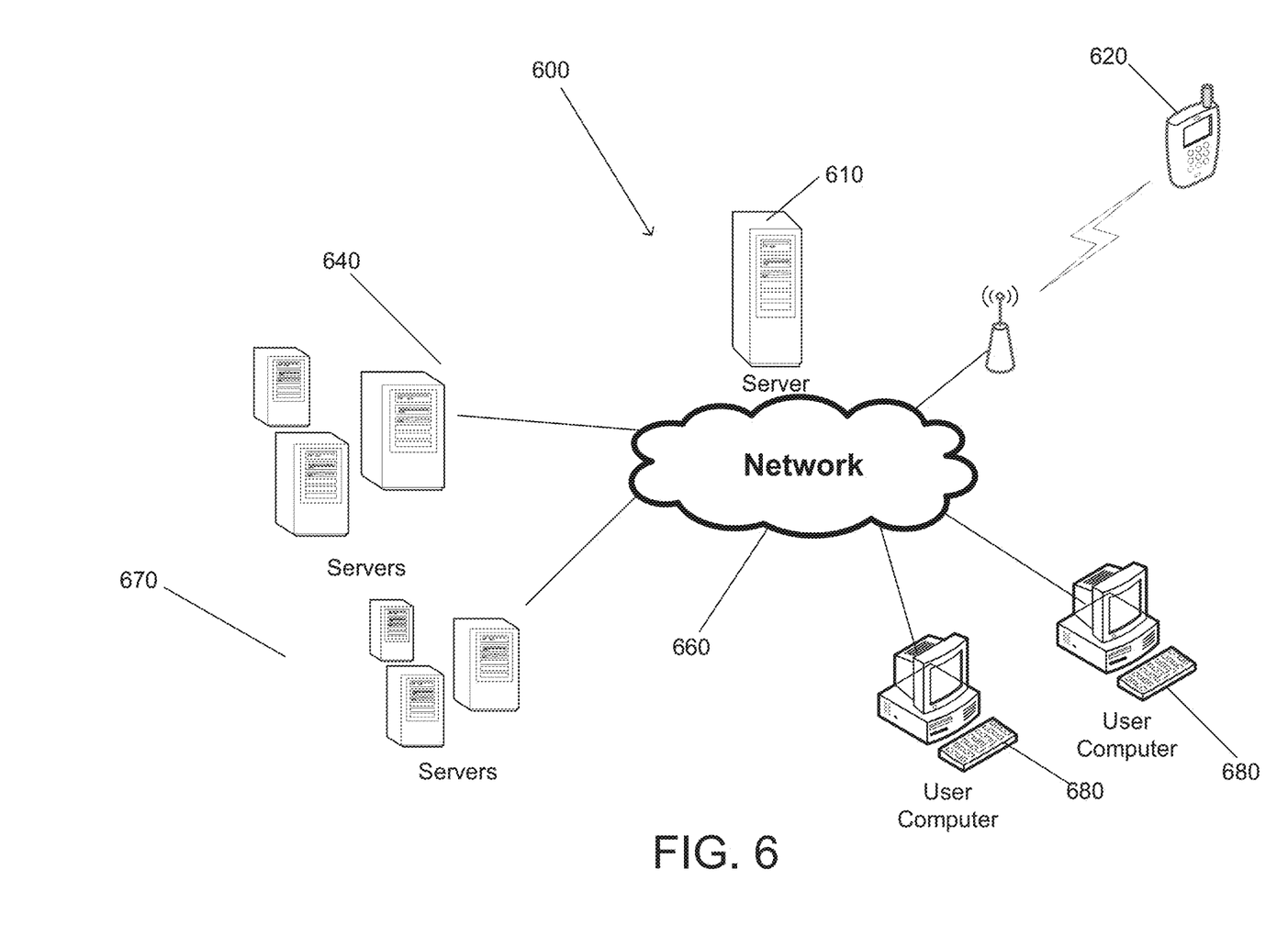
FIG. 6 illustrates an example of a selective transmission system that selectively transmits and plays back video in accordance with an embodiment of the invention.

A selective transmission system that transmit, encode, and/or decode video in accordance with some embodiments of the invention is shown in FIG. 6. Network 600 includes a communications network 660. The communications network 660 is a network such as the Internet that allows devices connected to the network 660 to communicate with other connected devices. Server systems 610, 640, and 670 are connected to the network 660. Each of the server systems 610, 640, and 670 is a group of one or more servers communicatively connected to one another via internal networks that execute processes that provide cloud services to users over the network 660. For purposes of this discussion, cloud services are one or more applications that are executed by one or more server systems to provide data and/or executable applications to devices over a network. The server systems 610, 640, and 670 are shown each having three servers in the internal network. However, the server systems 610, 640 and 670 may include any number of servers and any additional number of server systems may be connected to the network 660 to provide cloud services. In accordance with various embodiments of this invention, a selective transmission system that uses systems and methods that transmit, encode, and/or decode video in accordance with an embodiment of the invention may be provided by a process being executed on a single server system and/or a group of server systems communicating over network 660.

Users may use personal devices 680 and 620 that connect to the network 660 to perform processes that transmit, encode, and/or decode video in accordance with various embodiments of the invention. In the shown embodiment, the personal devices 680 are shown as desktop computers that are connected via a conventional "wired" connection to the network 660. However, the personal device 680 may be a desktop computer, a laptop computer, a smart television, an entertainment gaming console, or any other device that connects to the network 660 via a "wired" connection. The mobile device 620 connects to network 660 using a wireless connection. A wireless connection is a connection that uses Radio Frequency (RF) signals, Infrared signals, or any other form of wireless signaling to connect to the network 660. In FIG. 6, the mobile device 620 is a mobile telephone. However, mobile device 620 may be a mobile phone, Personal Digital Assistant (PDA), a tablet, a smartphone, or any other type of device that connects to network 660 via wireless connection without departing from this invention.

As can readily be appreciated the specific computing system used to selectively transmit, encode, and/or decode video is largely dependent upon the requirements of a given application and should not be considered as limited to any specific computing system(s) implementation.

Selective Transmission Element

Figure 7:
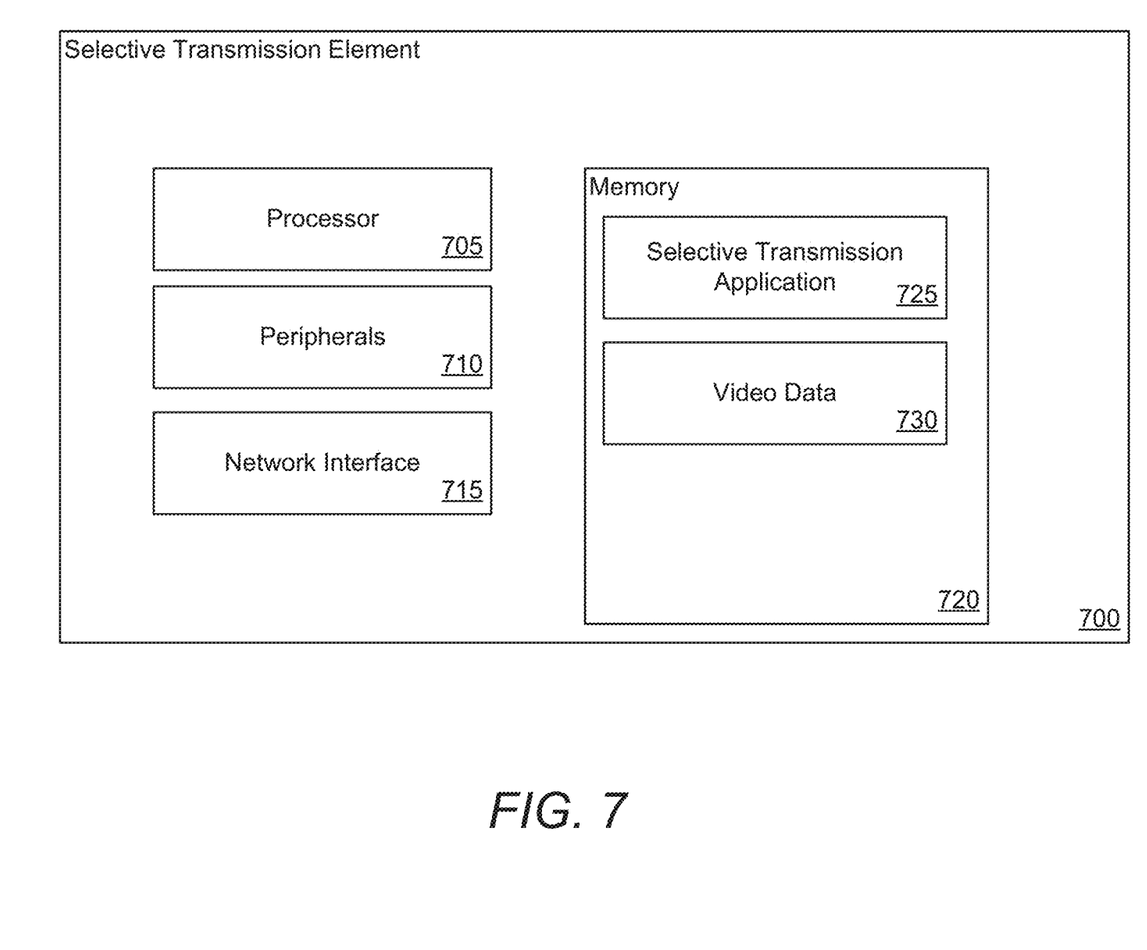
FIG. 7 illustrates an example of a selective transmission element that encodes video for selective transmission in accordance with an embodiment of the invention.

An example of a selective transmission element that executes instructions to perform processes that encodes and transmits video in accordance with various embodiments of the invention is shown in FIG. 7. Selective transmission elements in accordance with many embodiments of the invention can include (but are not limited to) one or more of mobile devices, cloud systems, servers, and computers. Selective transmission element 700 includes processor 705, peripherals 710, network interface 715, and memory 720.

One skilled in the art will recognize that a particular selective transmission element may include other components that are omitted for brevity without departing from this invention. The processor 705 can include (but is not limited to) a processor, microprocessor, controller, or a combination of processors, microprocessor, and/or controllers that performs instructions stored in the memory 720 to manipulate data stored in the memory. Processor instructions can configure the processor 705 to perform processes in accordance with certain embodiments of the invention.

Peripherals 710 can include any of a variety of components for capturing data, such as (but not limited to) cameras, displays, and/or sensors. In a variety of embodiments, peripherals can be used to gather inputs and/or provide outputs. Network interface 715 allows selective transmission element 700 to transmit and receive data over a network based upon the instructions performed by processor 705. Peripherals and/or network interfaces in accordance with many embodiments of the invention can be used to gather inputs such as (but not limited to) video data that can be used for a variety of applications of selective transmission including (but not limited to) live streaming, video conferencing, and/or broadcast.

Memory 720 includes a selective transmission application 725 and training data 735. Selective transmission applications in accordance with several embodiments of the invention can be used to transmit, encode, and/or decode video across a network. In a variety of embodiments, selective transmission applications can be distributed across a number of different devices and/or across multiple processors of a single device.

Although a specific example of a selective transmission element 700 is illustrated in FIG. 7, any of a variety of selective transmission elements can be utilized to perform processes for selectively transmitting, encoding, and/or decoding video similar to those described herein as appropriate to the requirements of specific applications in accordance with embodiments of the invention.

Selective Transmission Application

Figure 8:
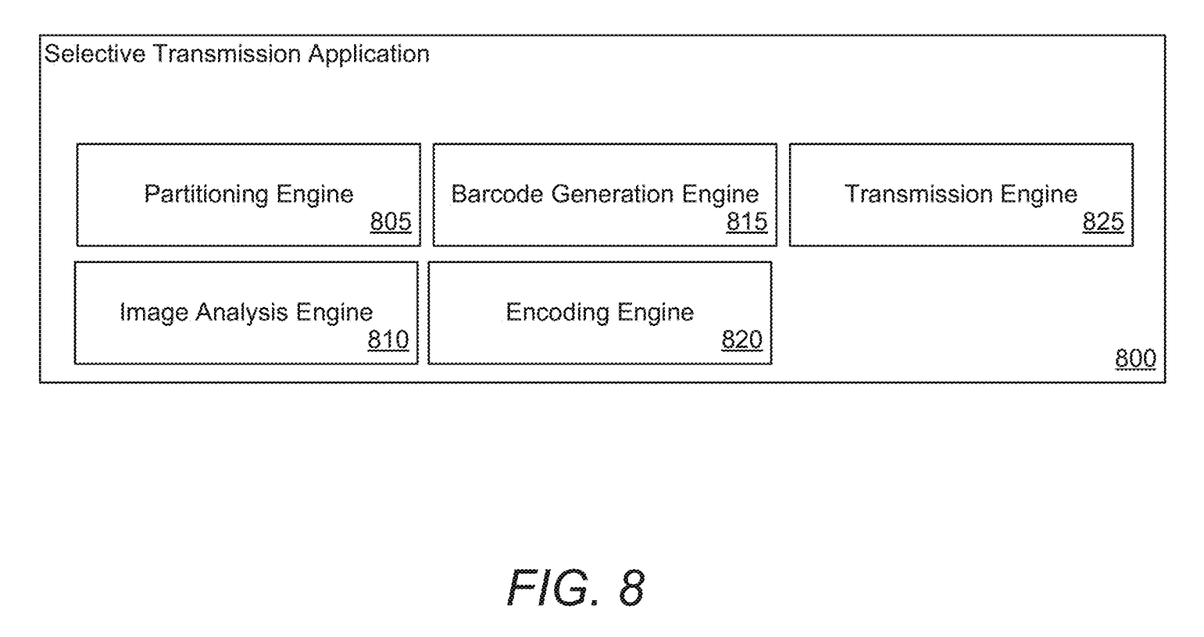
FIG. 8 illustrates an example of a selective transmission application that encodes video for selective transmission in accordance with an embodiment of the invention.

A selective transmission application for selectively transmitting and/or encoding video in accordance with an embodiment of the invention is illustrated in FIG. 8. Selective transmission application 800 includes partitioning engine 805, image analysis engine 810, barcode generation engine 815, encoding engine 820, and transmission engine 825.

Partitioning engines in accordance with many embodiments of the invention can partition each frame of video into a number of subgrids. In certain embodiments, the number, size, and/or shapes of the subgrids can change during a single session, based on various streaming conditions.

In several embodiments, image analysis engines can be used to analyze each subgrid of a frame. Image analysis engines in accordance with some embodiments of the invention can be used to determine a change between a current frame and a prior frame of a presentation (or session). In some embodiments, change levels are determined on a pixel-by-pixel basis, while the level of change for the subgrid is determined based on an aggregate value (or threshold) of the pixels within the subgrid. Image analysis engines in accordance with numerous embodiments of the invention can be used to identify active subgrids, or subgrids with the highest levels of change between frames.

Barcode generation engines in accordance with a variety of embodiments of the invention can be used to generate a barcode to be used as a part of longcanvas to encode a video frame. In a variety of embodiments, barcodes can represent locations of active subgrids within a given frame. Barcode generation engines in accordance with many embodiments of the invention can be configured to periodically generate a barcode that, rather than indicating the most active frames, is an inversion of a previous barcode, ensuring that all of the subgrids have been updated within one of the last two updates.

In a variety of embodiments, encoding engines can be used to encode a barcode, along with the corresponding video data in a longcanvas, which can be used to transmit video data for a frame to a receiving device. Longcanvases in accordance with a variety of embodiments of the invention can include a barcode along with video data for the subgrids indicated in the barcode.

Transmission engines in accordance with a number of embodiments of the invention can transmit the encoded video to a receiver device to be decoded and displayed to a user.

Decoder Element

Figure 9:
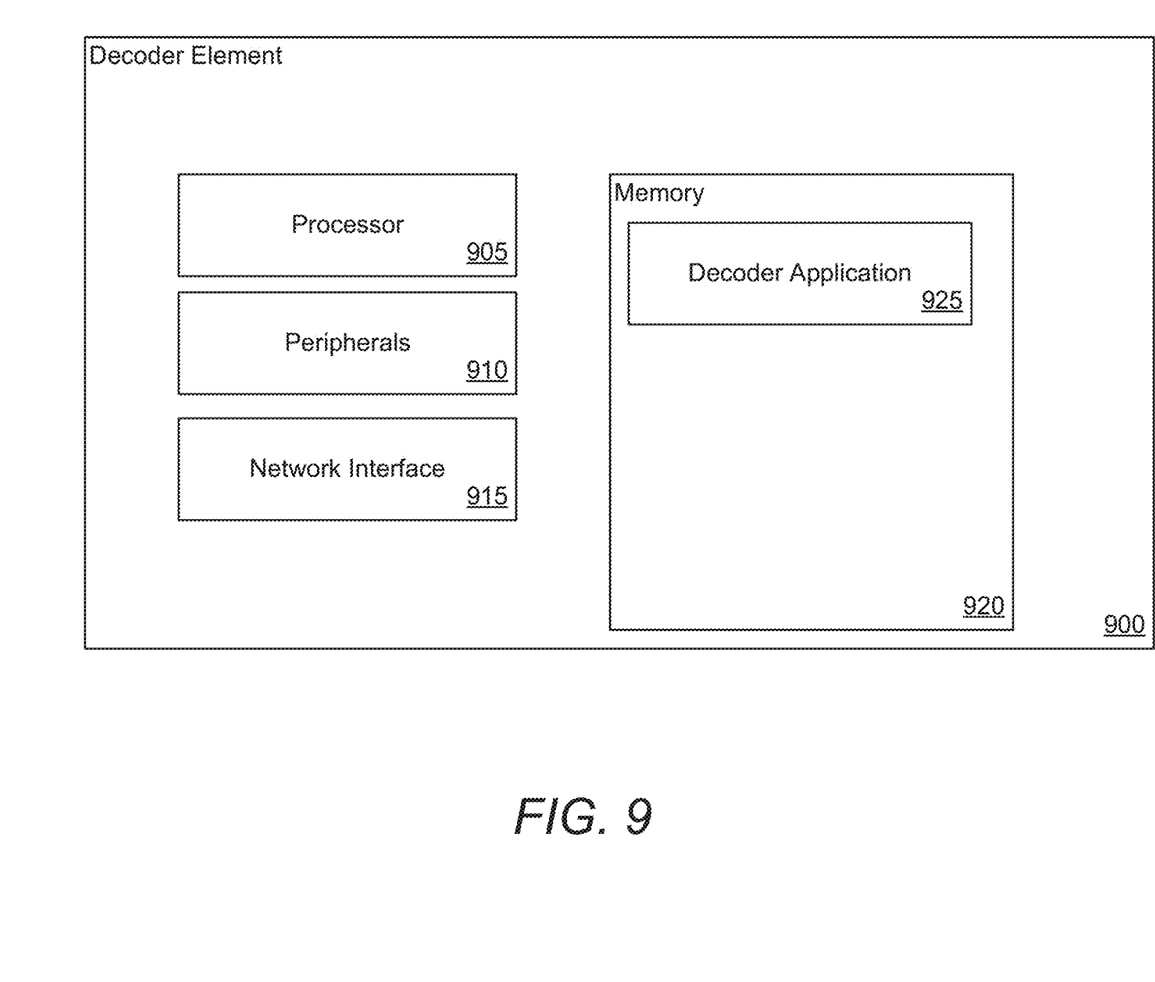
FIG. 9 illustrates an example of a decoder element that decodes video in accordance with an embodiment of the invention.

An example of a decoder element that executes instructions to decode video encoded in accordance with various embodiments of the invention is shown in FIG. 9. Decoder elements in accordance with many embodiments of the invention can include (but are not limited to) one or more of mobile devices, cloud systems, servers, and computers. Decoder element 900 includes processor 905, peripherals 910, network interface 915, and memory 920.

One skilled in the art will recognize that a particular decoder element may include other components that are omitted for brevity without departing from this invention. The processor 905 can include (but is not limited to) a processor, microprocessor, controller, or a combination of processors, microprocessor, and/or controllers that performs instructions stored in the memory 920 to manipulate data stored in the memory. Processor instructions can configure the processor 905 to perform processes in accordance with certain embodiments of the invention.

Peripherals 910 can include any of a variety of components for capturing data, such as (but not limited to) cameras, displays, and/or sensors. In a variety of embodiments, peripherals can be used to gather inputs and/or provide outputs. Network interface 915 allows decoder element 900 to transmit and receive data over a network based upon the instructions performed by processor 905. Peripherals and/or network interfaces in accordance with many embodiments of the invention can be used to gather inputs, such as encoded video, that can be encoded. In a number of embodiments, decoder elements can also operate as selective transmission elements, transmitting and receiving video (e.g., as part of a teleconference application).

Memory 920 includes a decoder application 925. Decoder applications in accordance with several embodiments of the invention can be used to decode longcanvases, painting canvases with new information to display selectively transmitted video.

Although a specific example of a decoder element 900 is illustrated in FIG. 9, any of a variety of decoder elements can be utilized to perform processes for decoding video similar to those described herein as appropriate to the requirements of specific applications in accordance with embodiments of the invention.

Decoder Application

Figure 10:
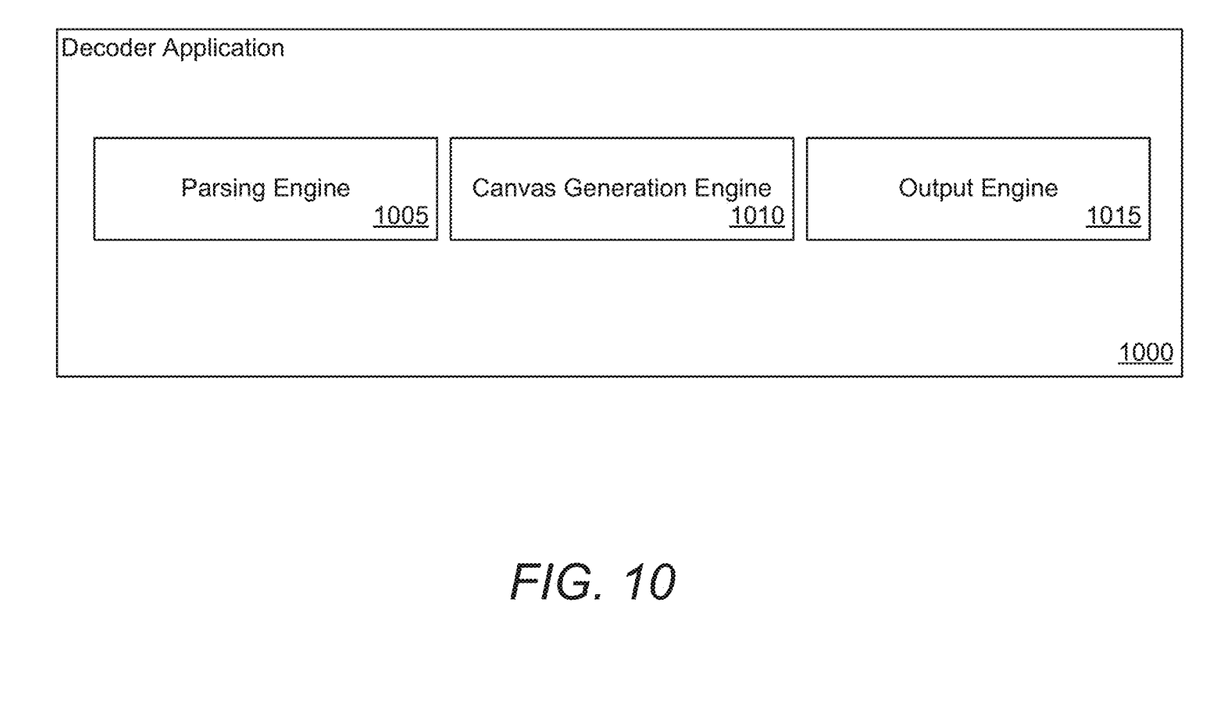
FIG. 10 illustrates an example of a decoder application that decodes video in accordance with an embodiment of the invention.

A decoder application for decoding selectively transmitted video in accordance with an embodiment of the invention is illustrated in FIG. 10. Decoder application 1000 includes parsing engine 1005, canvas engine 1010, and output engine 1015.

Parsing engines in accordance with certain embodiments of the invention can parse longcanvases to identify a barcode and each of the subgrids contained in the longcanvas. In numerous embodiments, parsing engines can determine the placement of the subgrids based on the received barcode.

In a variety of embodiments, canvas engines can maintain a display canvas and paint the subgrids to their appropriate locations on the canvas based on information from the barcode.

Output engines in accordance with several embodiments of the invention can provide a variety of outputs to a display for a user, including (but not limited to) rendered video (e.g., painted canvases).

Although specific methods of encoding, transmission, and decoding systems are discussed above, many different methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for transmitting video, the method comprising:
    partitioning a current frame of video into a plurality of subgrids;
    identifying active subgrids from the plurality of subgrids for the current frame;
    generating a longcanvas comprising a barcode and image data of the identified active subgrids, where the barcode is a 2-dimensional visualization of the current frame, wherein the visualization comprises a plurality of portions, wherein a position of each portion in the barcode corresponds to a position of a corresponding subgrid within the frame and portions corresponding to active subgrids are represented in a different color than portions corresponding to subgrids not selected as active; and
    transmitting the longcanvas to a destination device.

2. The method of claim 1, wherein identifying active subgrids comprises:
    comparing image data from each subgrid of the plurality of subgrids to corresponding subgrid in a previous frame to determine a level of change; and
    selecting a subset of the plurality of subgrids as active subgrids based on the comparison.

3. The method of claim 2, wherein:
    the level of change comprises a count of changed pixels in the particular subgrid, where a pixel is a changed pixel when a difference in a pixel value for a pixel in the current frame and a corresponding pixel value for a corresponding pixel in the previous frame exceeds a first threshold value; and
    selecting a subset of the plurality of subgrids as active subgrids comprises determining that a subgrid is an active subgrid when the count of changed pixels exceeds a second threshold value.

4. The method of claim 3, wherein computing a count of changed pixels in the particular subgrid comprises:
    sampling a subset of the pixels from the particular subgrid in the current frame and a corresponding subgrid in the previous frame; and
    determining whether each pixel of the subset of pixels exceeds the first threshold value.

5. The method of claim 2, wherein selecting a subset of the plurality of subgrids as active subgrids comprises:
    sorting the plurality of subgrids based on the determined level of change; and
    selecting a predetermined number of subgrids as active subgrids.

6. The method of claim 1, wherein the portions of the barcode and the image data of each of the active subgrids have a same aspect ratio.

7. The method of claim 1, wherein identifying active subgrids comprises:
    determining whether a duration since a last inverted barcode exceeds a threshold value, wherein the duration comprises at least one of a number of frames and a period of time; and
    selecting all subgrids not identified as active in a previous frame as active subgrids when the duration exceeds the threshold value.

8. A method for decoding video, the method comprising:
    receiving a longcanvas comprising a barcode and image data of the active subgrids, where the barcode is a 2-dimensional visualization of the current frame, wherein the visualization comprises a plurality of portions, wherein a position of each portion in the barcode corresponds to a position of a corresponding subgrid within a frame and portions corresponding to active subgrids are represented in a different color than portions corresponding to subgrids not selected as active;
    analyzing the barcode to determine the position for each active subgrid; and
    updating a canvas with the image data of the active subgrids at the determined locations.

9. The method of claim 8, wherein the barcode and the image data of each of the active subgrids have a same aspect ratio.

10. A non-transitory machine readable medium containing processor instructions for transmitting video, where execution of the instructions by a processor causes the processor to perform a process that comprises: partitioning a current frame of video into a plurality of subgrids; identifying active subgrinds from the plurality of subgrids for the current frame; generating a longcanvas comprising a barcode and image data of the identified active subgrids, where the barcode is a 2-dimensional visualization of the current frame, wherein the visualization comprises a plurality of portions, wherein a position of each portion in the barcode corresponds to a position of a corresponding subgrid within the frame and portions corresponding to active subgrids are represented in a different color than portions corresponding to subgrids not selected as active; and transmitting the longcanvas to a destination device.

11. The non-transitory machine readable medium of claim 10, wherein identifying active subgrids comprises:
    comparing image data from each subgrid of the plurality of subgrids to corresponding subgrid in a previous frame to determine a level of change; and selecting a subset of the plurality of subgrids as active subgrids based on the comparison.

12. The non-transitory machine readable medium of claim 11, wherein:
the level of change comprises a count of changed pixels in the particular subgrid, where a pixel is a changed pixel when a difference in a pixel value for a pixel in the current frame and a corresponding pixel value for a corresponding pixel in the previous frame exceeds a first threshold value; and
selecting a subset of the plurality of subgrids as active subgrids comprises determining that a subgrid is an active subgrid when the count of changed pixels exceeds a second threshold value.

13. The non-transitory machine readable medium of claim 12, wherein computing a count of changed pixels in the particular subgrid comprises:
sampling a subset of the pixels from the particular subgrid in the current frame and a corresponding subgrid in the previous frame; and
determining whether each pixel of the subset of pixels exceeds the first threshold value.

14. The non-transitory machine readable medium of claim 11, wherein selecting a subset of the plurality of subgrids as active subgrids comprises:
sorting the plurality of subgrids based on the determined level of change; and
selecting a predetermined number of subgrids as active subgrids.

15. The non-transitory machine readable medium of claim 10, wherein the portions of the barcode and the image data of each of the active subgrids have a same aspect ratio.

16. The non-transitory machine readable medium of claim 10, wherein identifying active subgrids comprises:
determining whether a duration since a last inverted barcode exceeds a threshold value, wherein the duration comprises at least one of a number of frames and a period of time; and
selecting all subgrids not identified as active in a previous frame as active subgrids when the duration exceeds the threshold value.

* * * * *

UNITED STATES PATENT AND TRADEMARK OFFICE
CERTIFICATE OF CORRECTION

| | |
|---|---|
| PATENT NO. | : 10,986,337 B2 |
| APPLICATION NO. | : 16/548661 |
| DATED | : April 20, 2021 |
| INVENTOR(S) | : Mike Burns et al. |

It is certified that error appears in the above-identified patent and that said Letters Patent is hereby corrected as shown below:

On the Title Page

In the listing of the inventors, at item (72), after "Erik Maltais, Tampa, FL (US)" insert the following --; Kunal Bansal, Tampa, FL (US)--.

Signed and Sealed this
Seventeenth Day of May, 2022

Katherine Kelly Vidal
*Director of the United States Patent and Trademark Office*